Sept. 24, 1940.   S. B. GAHM   2,215,873
MOTOR DRIVEN PUMP
Filed June 14, 1938   4 Sheets-Sheet 1

Inventor
Samuel Bernard Gahm

Sept. 24, 1940.   S. B. GAHM   2,215,873
MOTOR DRIVEN PUMP
Filed June 14, 1938   4 Sheets-Sheet 2
Fig. 3.
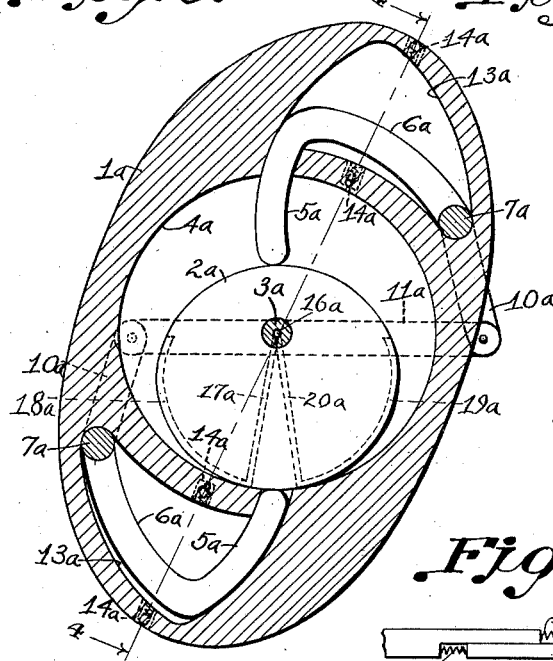
Fig. 4.
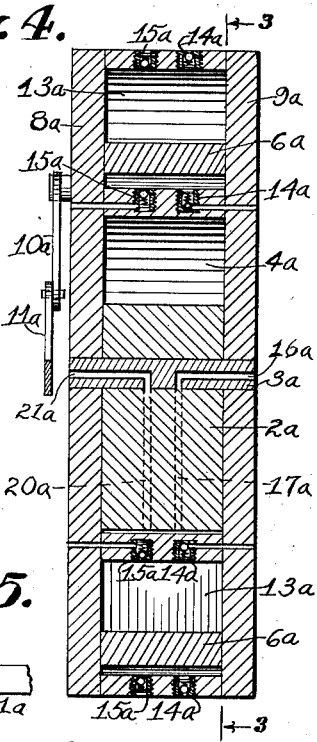
Fig. 5.
Fig. 6.
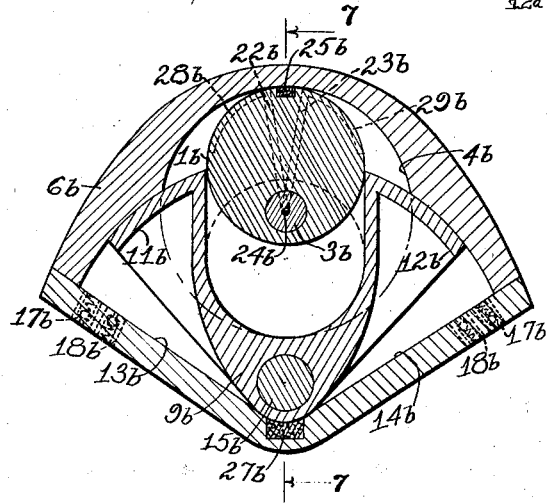
Fig. 7.
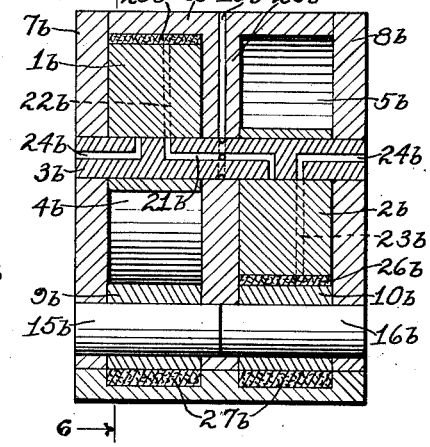
Inventor
Samuel Bernard Gahm

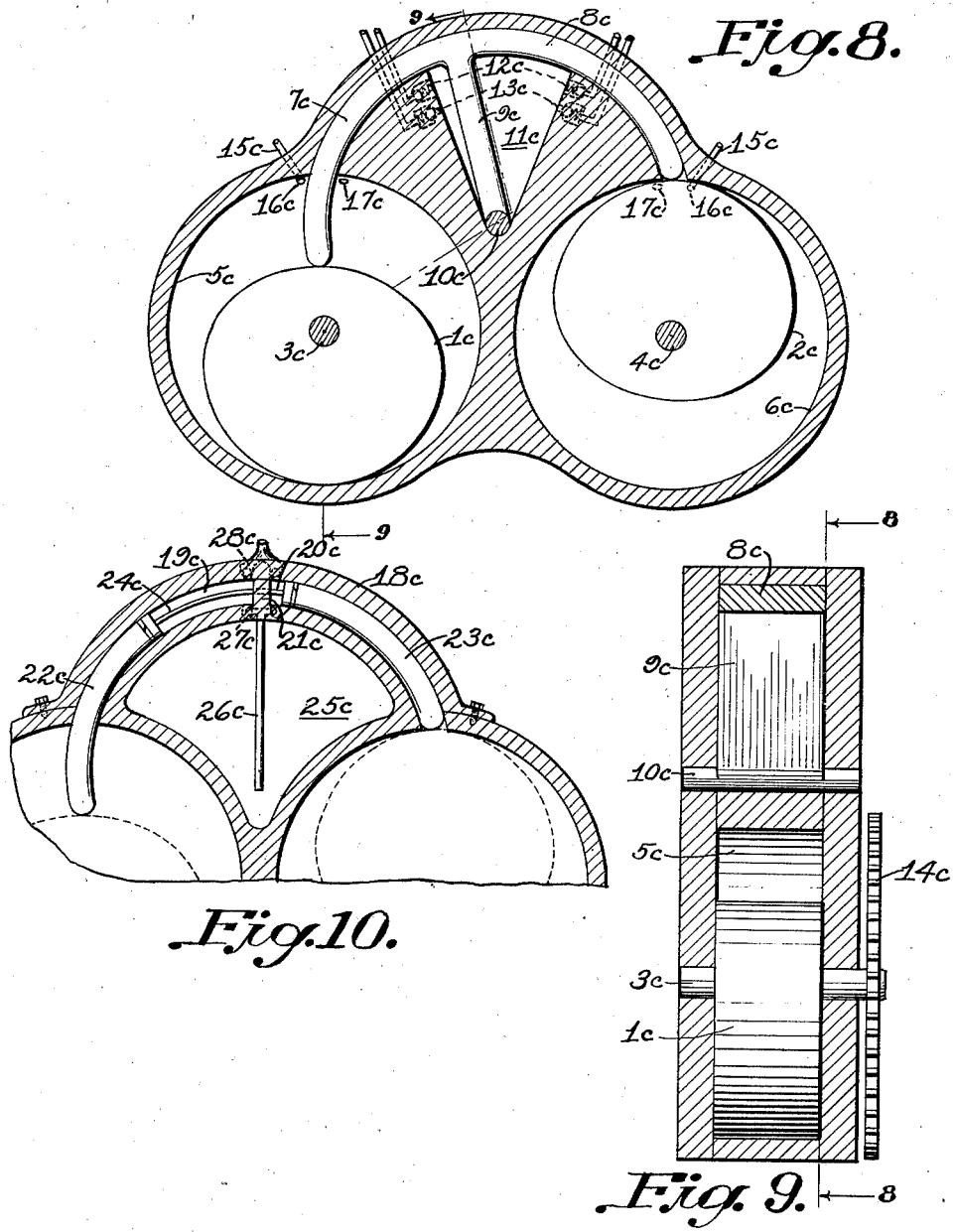

Sept. 24, 1940.　　　S. B. GAHM　　　2,215,873
MOTOR DRIVEN PUMP
Filed June 14, 1938　　　4 Sheets-Sheet 4

Inventor
Samuel Bernard Gahm.

Patented Sept. 24, 1940

2,215,873

UNITED STATES PATENT OFFICE 2,215,873

MOTOR DRIVEN PUMP

Samuel Bernard Gahm, Queens Village, N. Y.

Application June 14, 1938, Serial No. 213,676

17 Claims. (Cl. 103—57)

This invention relates broadly to a novel combination of an expansible chamber motor for driving a pump or compressor structure. More specifically, this invention combines a rotary expansible chamber motor, which may be any one of a large variety of types, with a novel pumping structure driven thereby in such a manner that an element of the rotary motor functions at the same time as an element of the pumping structure.

In any abutment type or certain vane type rotary engine, the abutments or vanes against which the fluid reacts to cause rotation of the rotor, receive a periodic motion as a consequence of the rotor movement. This invention contemplates utilizing this motion to produce a pumping action which is accomplished broadly by providing a pump cylinder in which the abutment or vane acting as a pump piston is confined to reciprocate to produce pumping.

The motor may be operated by any medium under a positive pressure or by suction without necessitating any change whatever in the structure. The motor pump combination of this invention may have many uses where a source of pressure or suction is available. For example, at service stations where air pressure is always available, it may be used to pump grease at high pressure for chassis lubrication or for pumping the oil out of crankcases of vehicle motors. If the motor is connected to the suction manifold of an internal combustion engine, the pump may be used to pump paint through a spraying nozzle or for the same uses of grease or oil pumping as mentioned above.

An important feature of the invention is that there is no connection between the fluids used in the motor and that which is pumped by the pump of my new combination. The motor may be driven by air or steam and the pump will pump liquid or any other fluid. At no time is it contemplated to have the pumped fluid enter the motor to be used as an element in driving the motor. Part of the pumped fluid may be used as a lubricant or seal for the motor but never as a driving medium therefor. The cooperation between the motor and pump in this combination is in a mechanical connection only.

The specific final designs and manner of assembly is not contemplated as part of the present invention.

This disclosed structures are meant to be representative only of the basic invention and are not to limit the applications of this invention. Various other motor and/or pump structures may be used as may fall within the scope of the claims.

Figure 3 is a sectional view of a modification taken on line 3—3 of Figure 4.

Figure 4 is a sectional view taken on line 4—4 of Figure 3.

Figure 5 is a fragmentary showing of a modified structure for the interconnecting link for the abutments of Figure 3.

Figure 6 is a sectional view of another modification taken on line 6—6 of Figure 7.

Figure 7 is a sectional view taken on line 7—7 of Figure 6.

Figure 8 is a sectional view of another modification taken on line 8—8 of Figure 9.

Figure 9 is a sectional view taken on line 9—9 of Figure 8.

Figure 10 is a modified showing of the abutment pump structure of Figure 8.

Figure 1:
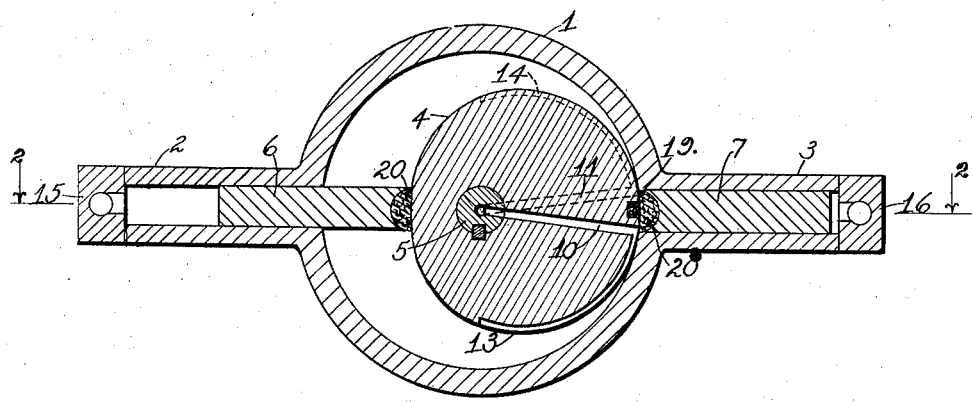
Figure 1 is a sectional view taken on line 1—1 of Figure 2.
Figure 2:
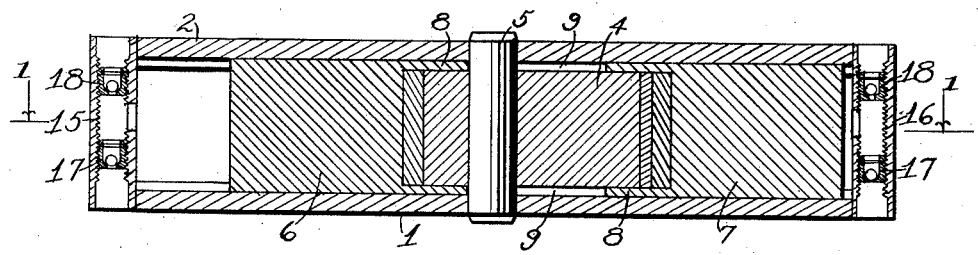
Figure 2 is a sectional view taken on line 2—2 of Figure 1.

The modification shown by Figs. 1 and 2 is one in which the motor is a sliding abutment type rotary motor and the abutments act as pumping elements.

The casing 1 is cylindrical and has pump cylinder extensions 2 and 3 which have a dual function, namely, as housings for the sliding abutments and as pump cylinders. The rotor 4 is keyed to rotate with shaft 5. It is designed as a limacon curve so that there is always a constant distance between the abutments 6 and 7. The abutments are tied together as a unit by arms 8 which are slotted at 9 to provide for passing the shaft therethrough.

Fluid inlet and exhaust are connected through the shaft to radial passages 10 and 11 in the rotor which connect to the rotor surface at opposite sides of the high point of the rotor, that is, where it contacts the cylinder. Grooves 13 and 14 on the surface of the rotor extend from the extremity of passages 10 and 11 circumferentially around the rotor an equal distance to a point where a line connecting the ends of these grooves will pass through the center of shaft 5. With such an arrangement of fluid delivery to the motor there is no dead center position for the rotor at any time and all valves are eliminated since the rotor acts as such in its rotation.

The ends of the abutments fitting in extensions 2 and 3 act as pump pistons.

Cover plates 15 and 16 which contain inlet and outlet check valves 17 and 18 complete the pump structure.

The rotor and abutments are provided with suitable packings 19 and 20.

Any suitable pressure source may be used to drive the motor and it is admitted by way of the shaft passage to passage 10, the exhaust of the expanded air passing out through 11. The fluid to be pumped is connected to cover plates 15 and 16 on the side of intake check valves 17 and is delivered through check valves 18 for any desired use or to a suitable storage tank (not shown).

A suitable application of this motor-pump combination, or any of the hereinafter disclosed structures, is in pumping lubricant at automobile service stations to be used in lubricating vehicle chasses or for pumping oil out of motor crank-cases. A source of air pressure for driving the motor is always available at such stations.

The modification shown by Figures 3 and 4 employs swinging abutments for the rotary motor and an arm of each abutment fits into a closed chamber which acts as a pump cylinder.

The casing 1a houses a rotor 2a rotatable with shaft 3a in cylindrical chamber 4a. The rotor is designed as a slightly distorted limacon curve, or it may be any other suitable curve which will keep a constant distance between the rotor contacting points of the two abutments. A true limacon curve for the rotor will not so function in this modification because of the arcuate motion of the abutments. The rotor is designed by methods well-known in the art of cam design.

The abutments are L-shaped having arms 5a, 6a and are rigid with shafts 7a which are oscillatably mounted in bearings in side plates 8a, 9a. The abutment shafts extend beyond the side plates to rigidly carry links 10a. These are interconnected by the cross link 11a and all this linkage functions to keep the abutments moving in synchronism and in contact with the rotor. Due to the rotor shape the amount of rise of one abutment per degree of rotor revolution exactly equals the amount of drop of the other abutment per degree of rotor revolution. The linkage thus functions to keep the abutments in contact with the rotor.

If the cross link 11a were cut in two portions (Fig. 5) and compression springs 12a placed between them to force the two apart to keep the abutments in contact with the rotor, then it will be evident that the rotor need not be of such an exact design and even an ordinary circular eccentric rotor may be used. This would simplify the manufacturing cost. A small clearance is provided between the two parts of the cross link, just enough to take care of the inaccuracy in rotor design, so that one abutment will positively force the other abutment against the rotor.

The arms 5a of the abutments are arcuate and are slidable in suitable slots which act as guides for these arms.

Pump cylinders 13a are provided in the upper and lower portions of casing 1a which house the arms 6a of the abutments. These arms 6a fit tightly in cylinders 13a and act as pump pistons as they are oscillated by the rotation of the rotor. Suitable inlet and outlet check valves 14a, 15a are fitted into the casing 1a for the pump cylinders. Because chambers are formed on both sides of arms 6a, double acting pumps are provided by this construction.

The motor receives pressure through shaft bores 16a which deliver to radial bore 17a in the rotor and arcuate groove 18a on the rotor surface. The exhaust takes place through arcuate groove 19a, radial bore 20a and shaft bore 21a. Grooves 18a and 19a extend equal distances in opposite directions to a point where a line drawn between them would pass through the center of shaft 3a. This structure avoids a dead center position for the rotor.

Continuous application of pressure through 16a, 17a and 18a will rotate the rotor which will oscillate the abutments to cause pumping in the pump cylinders.

Suitable packings and sealing means would be provided wherever considered necessary, but these are not shown since they form no part of the present invention.

The modification shown by Figures 6 and 7 comprises two circular eccentric rotors on the same shaft arranged in two adjoining cylinders. They are set 180 degrees out of phase. Each rotor has a swinging abutment cooperating with it which fits into a closed chamber and the oscillating motion of the abutment causes a pumping action in the abutment chamber.

The rotors 1b, 2b fixed to rotate with shaft 3b are eccentrically mounted and are arranged in separate rotor cylinders 4b, 5b which are formed in casing 6b and closed by side plates 7b, 8b. The rotors are set 180 degrees out of phase. Cooperating with the rotors are abutments 9b, 10b which are U-shaped at the portions contacting the rotor. These abutments have arcuate arms 11b, 12b which are slidable in fluid tight relation in pumping chambers 13b, 14b formed in the lower part of casing 6b as is clearly shown on Fig. 6. The abutments are mounted to oscillate with separate shafts 15b, 16b or they may be oscillatable relative to these shafts.

Inlet and outlet check valves 17b, 18b are provided for the pumping chambers.

The motors receive fluid pressure through a bore 19b in the separating plate 20b between the two cylinder chambers. A circumferential groove on the shaft 3b and radial ports leading from this groove connect bore 19b to axial bore 21b which branches to both rotors. Radial ports 22b connect 21b to the cylinder work chambers. Other radial ports 23b connect to axial shaft bores 24b for exhaust of the expanded fluid used in the motors.

Suitable packings 25b and 26b are provided for the rotors and packings 27b are set in the casing to separate pump cylinders 13b, 14b.

Slots 28b and 29b on the rotor surfaces give lengthy port openings for the intake and exhaust of the fluid.

The degree of compression ratio can be varied by varying the amounts cut out at the backs of the abutments which act as the pump pistons. The less cut out of these abutments the greater will be the compression ratio.

The rotors will rotate continuously as long as pressure is supplied and due to their eccentricity the abutments will oscillate to cause pumping action in chambers 13b and 14b.

The modification shown by Figures 8, 9 and 10 comprises two rotors mounted in separate cylinders and having one abutment structure cooperating between both rotors, the abutment structure being arranged to do the pumping.

The rotors 1c, 2c are set to rotate with two parallel shafts 3c, 4c and are arranged 180 degrees out of phase with each other. The rotors are set in separate cylinders 5c, 6c and are designed of the same shape as the rotor shown by Figure 3.

An arcuate abutment structure always contacts both rotors because of the rotor design and receives an oscillating motion as the rotors rotate. The abutment has two arcuate portions 7c, 8c extending from opposite sides of a central radial portion 9c which is connected to shaft 10c to oscillate with it. The arc of the arcuate portions 7c, 8c is taken about 10c as a center.

A pumping chamber 11c is formed in the casing that houses the whole structure. The radial portion 9c of the abutment structure is arranged to oscillate in the pumping chamber 11c and makes a fluid tight fit in that chamber so that it functions as the pumping piston. Check valves 12c, 13c are provided for intake and exhaust of the fluid to be pumped.

The rotors are arranged to rotate in synchronism and in opposite directions by gearing 14c. Intake of pressure to drive the rotors is by way of pipes 15c which terminate in the cylinder chambers at ports 16c. Exhaust of the expanded fluid is through ports 17c. It will be noted that ports 16c and 17c connect into the cylinder chamber at points slightly inward from the periphery of chambers 5c, 6c. This is to allow blocking of these ports by the rotors when they reach top dead center position and thus prevent direct communication between the intake and exhaust which would occur if these ports came into the cylinders at their periphery.

Suitable packings would be provided wherever found necessary but these are not shown since they form no part of the present invention.

Rotation of the rotors by continuous application of pressure causes oscillation of the abutment and pumping action takes place as a consequence in chamber 11c by the oscillation of 9c which is integral with the abutment.

Figure 10 shows a modification of the pumping portion of the abutment structure of Figs. 8 and 9. The abutment housing 18c is divided into two separate chambers 19c, 20c by a separating wall 21c. Also the abutment is broken in two parts 22c, 23c which are joined together by one or more thin arcuate rods 24c which pass through the separating wall 21c.

A pump reservoir 25c may be provided in the casing which is connected by a pipe 26c to intake check valves 27c of the chambers 19c, 20c which act as pumping chambers as well as abutment housings. Outlet check valves 28c complete the fluid circuit for the pump structure.

The ends of the abutment parts 22c, 23c act as the pump pistons which cooperate with the separating wall 21c to produce two pumping cylinders.

Suitable packings may be provided wherever found necessary but such are not shown.

Figure 11:
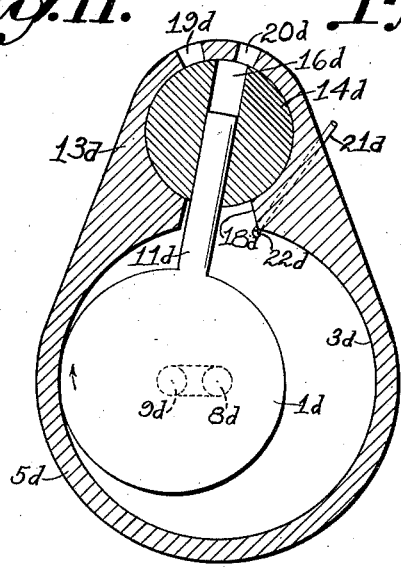
Figure 11 is a sectional view of another modification taken on line 11—11 of Figure 12.
Figure 12:
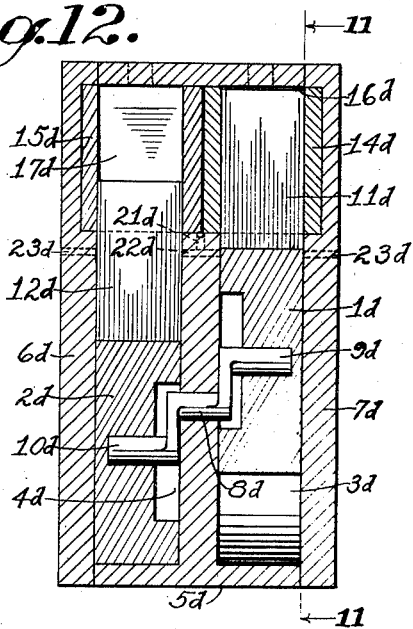
Figure 12 is a vertical sectional view of Figure 11 with the rotors advanced 90 degrees.

The modification shown by Figures 11 and 12 employs a planetating piston type rotary motor with a vane connected integrally with the piston or rotor to be moved thereby, this vane acting as a pumping element.

The pistons or rotors 1d, 2d are mounted in separate cylinders 3d, 4d in the casing 5d and are enclosed by side walls 6d, 7d. An intermediate wall separates the two cylinders. A crank shaft 8d having two cranks 9d, 10d set 180 degrees out of phase is rotatably mounted in the intermediate wall. On the crank pins of the crank shaft are mounted the planetating pistons 1d, 2d, which carry vanes 11d, 12d integral therewith.

The casing 5d has an extension 13d in which are rotatably mounted separate plugs 14d, 15d. The plugs have slots 16d, 17d of such cross section as to receive the vanes 11d, 12d in fluid tight relation. These slots therefore act as guides and cylinders for the vanes. Suitable cut out portions 18d are provided in the cylinders where they adjoin the plug housings to allow for the oscillation of the vanes as the pistons planetate. Inlet and exhaust ports 19d, 20d cut through the casing extension 13d communicate with the slots 16d, 17d above the tops of the vanes as the plugs 14d, 15d are oscillated by the pistons and vanes.

The motors receive pressure fluid through pipe 21d and passages 22d in the intermediate wall. Exhaust takes place through ports 23d in the side plates. Passages 22d and ports 23d communicate with the piston chambers at points slightly inwardly of the periphery of the cylinders 3d, 4d so that they will be blocked off by the pistons at their top dead center and thus prevent direct communication between the intake and exhaust.

The pistons or rotors being mounted on the crank pins of the crank shaft and being constrained by the vanes which slide in slots 16d, 17d will receive a planetating motion upon continuous application of pressure fluid through 21d and 22d. The reciprocation and oscillation of the integral vanes 11d, 12d will cause a pumping action in slots 16d, 17d which act as pump cylinders. No check valves are necessary in ports 19d, 20d since the oscillation of plugs 14d, 15d will produce a valving action by cutting off these ports at the proper time for each stroke of the pumps.

Figure 13:
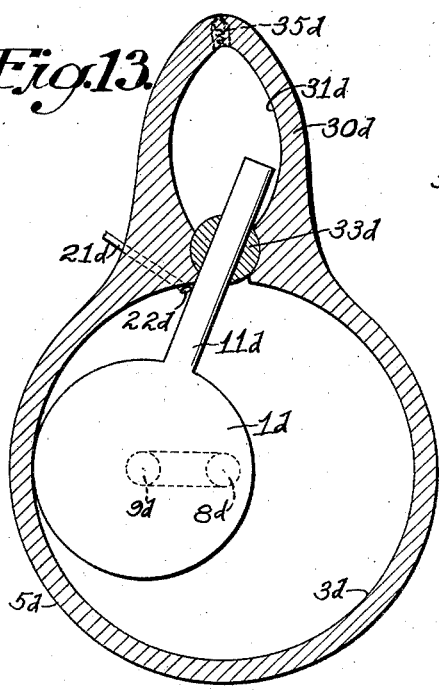
Figure 13 is a sectional view of another modification taken on line 13—13 of Figure 14.
Figure 14:
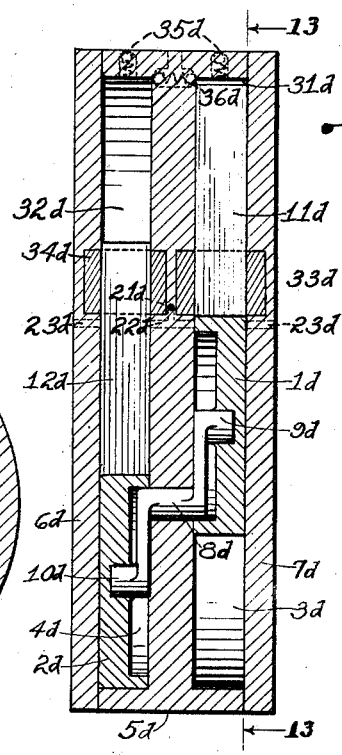
Figure 14 is a vertical sectional view of Figure 13 with the rotors advanced 90 degrees.

Figures 13 and 14 show the same type of motors as in Figures 11 and 12. The difference in this modification is in the pump design. The same numerals will be used for the parts that are the same in these two modifications.

The main casing 5d has an extension 30d in which are formed two vane receiving displacement pump chambers 31d, 32d, one for each of the vanes 11d, 12d. These chambers are separated from the rotor chambers 3d, 4d by slotted plugs 33d, 34d which receive the vanes 11d, 12d through the slots in fluid tight relation. The pump chambers are connected by intake check valves 35d to a suitable source of fluid to be pumped and by outlet check valves 36d to a suitable delivery point.

The mode of operation is the same as in the modification shown by Figures 11 and 12.

I claim:

1. The combination of a pressure fluid expansible chamber rotary motor and a pump driven thereby, a plurality of chambers forming cylinders for the motor, a rotor in each of said cylinders, said rotors being interconnected to operate in synchronism with each other, a swinging abutment in each of said cylinders and maintained in contact with its individual rotor against which the pressure fluid reacts to cause rotation of the rotors, the abutments being connected and maintained in definite phase relation and in synchronism with each other, the structure and operative relationship between the abutments and rotors providing means whereby the abutments are positively oscillated in both directions of their swinging movement, the pump structure comprising a pump chamber and a pumping element acting within said pump chamber, the pumping element being connected to and operated by a swinging abutment.

2. The combination of a pressure fluid expansible chamber rotary motor and a pump driven thereby, a plurality of chambers forming cylinders for the motor, a rotor in each of said cylinders, said rotors being interconnected to operate in synchronism with each other, a swinging abutment in each of said cylinders and maintained in contact with its individual rotor against which the pressure fluid reacts to cause rotation of the rotors, the abutments being connected and maintained in definite phase relation and in synchronism with each other, the structural and operative relationship between the abutments and rotors providing means whereby the abutments are positively oscillated in both directions of their swinging movement, the pump structure comprising pump chambers and a pumping element acting within each of said pump chambers, each pumping element being connected to and operated by a swinging abutment.

3. The combination of a pressure fluid expansible chamber rotary motor and a pump driven thereby, a plurality of chambers forming cylinders for the motor, a rotor in each of said cylinders, said rotors being interconnected to operate in synchronism with each other, a swinging abutment in each of said cylinders and maintained in contact with its individual rotor against which the pressure fluid reacts to cause rotation of the rotors, the abutments being connected and maintained in definite phase relation and in synchronism with each other, the structural and operative relationship between the abutments and rotors providing means whereby the abutments are positively oscillated in both directions of their swinging movement, the pump structure comprising a pump chamber for each motor cylinder and a pumping element for each pump chamber, each pumping element being rigidly connected to an abutment to be operated thereby.

4. The combination of a pressure fluid expansible chamber rotary motor and a pump driven thereby, a plurality of chambers forming cylinders for the motor arranged in line, a shaft passing through said cylinders, rotors for said cylinders mounted on said shaft and arranged out of phase with each other, said rotors being interconnected to operate in synchronism with each other, a swinging abutment in each motor cylinder and cooperating with its individual rotor against which the fluid reacts to cause rotation of the rotors, the abutments being connected and maintained in definite phase relation and in synchronism with each other, the structural and operative relationship between the abutments and rotors providing means whereby the abutments are positively oscillated in both directions of their swinging movement, the pump structure comprising a pump chamber, a pumping element acting within said pump chamber, the pumping element being connected to and operated by a swinging abutment.

5. The combination of a pressure fluid expansible chamber rotary motor and a pump driven thereby, a plurality of chambers forming cylinders for the motor arranged in line, a shaft passing through said cylinders, rotors for said cylinders mounted on said shaft and arranged out of phase with each other, said rotors being interconnected to operate in synchronism with each other, a swinging abutment in each motor cylinder and cooperating with its individual rotor against which the fluid reacts to cause rotation of the rotors, the abutments being connected and maintained in definite phase relation and in synchronism with each other, the structural and operative relationship between the abutments and rotors providing means whereby the abutments are positively oscillated in both directions of their swinging movement, the pump structure comprising a plurality of pump chambers, a pumping element acting within each of said pump chambers, each pumping element being connected to and operated by a swinging abutment.

6. The combination of a pressure fluid expansible chamber rotary motor and a pump driven thereby, a plurality of chambers forming cylinders for the motor arranged in line, a shaft passing through said cylinders, rotors for said cylinders mounted on said shaft and arranged out of phase with each other, said rotors being interconnected to operate in synchronism with each other, a swinging abutment in each motor cylinder and cooperating with its individual rotor against which the fluid reacts to cause rotation of the rotors, the abutments being connected and maintained in definite phase relation and in synchronism with each other, the structural and operative relationship between the abutments and rotors providing means whereby the abutments are positively oscillated in both directions of their swinging movement, the pump structure comprising a set of pump chambers for each motor cylinder, a pumping element acting within each of said pump chambers, the pumping elements for each set of pump chambers for each motor cylinder being connected to and operated by the swinging abutment of the corresponding motor cylinder.

7. The combination of a pressure fluid expansible chamber rotary motor and a pump driven thereby, a plurality of chambers forming cylinders for the motor arranged in line, a shaft passing through said cylinders, rotors for said cylinders mounted on said shaft and arranged out of phase with each other, said rotors being interconnected to operate in synchronism with each other, a swinging abutment in each motor cylinder and cooperating with its individual rotor against which the fluid reacts to cause rotation of the rotors, the abutments being connected and maintained in definite phase relation and in synchronism with each other, the structural and operative relationship between the abutments and rotors providing means whereby the abutments are positively oscillated in both directions of their swinging movement, each abutment having two arms, the pump structure comprising a plurality of pump chambers for each motor cylinder, each arm of an abutment slidable in a pump chamber in fluid tight relation therewith and functioning as the pumping element therefor.

8. The combination of a pressure fluid expansible chamber rotary motor and a pump driven thereby, a plurality of chambers forming cylinders for the motors arranged in side by side relation, a rotor rotatably mounted in each cylinder, said rotors being interconnected and arranged out of phase with each other and operating in synchronism with each other, an abutment in each motor cylinder and cooperating with its individual rotor against which the pressure fluid reacts to cause rotation of the rotors, said abutments being connected together to move as one, the structural and operative relationship between the abutments and rotors providing means whereby the abutments are positively oscillated in both directions of their swinging movement, said pump comprising a pump chamber, a pumping element oscillatable in said chamber, said pumping element being rigidly connected to said abutments to be oscillatable therewith.

9. The combination of a pressure fluid expansible chamber rotary motor and a pump driven thereby, a plurality of chambers forming cylinders for the motors arranged in side by side relation, a rotor rotatably mounted in each cylinder, said rotors being interconnected and arranged out of phase with each other and operating in synchronism with each other, an abutment in each motor cylinder and cooperating with its individual rotor against which the pressure fluid reacts to cause rotation of the rotors, said abutments being connected together to move as one, the structural and operative relationship between the abutments and rotors providing means whereby the abutments are positively oscillated in both directions of their swinging movement, said pump comprising a pump chamber arranged between the motor chambers, a pumping element rigidly connected to the abutments to be operable therewith, said pumping element being oscillatable in said pumping chamber as said abutments oscillate to produce a pumping action.

10. The combination of a pressure fluid expansible chamber rotary motor and a pump driven thereby, a plurality of chambers forming cylinders for the motors arranged in side by side relation, a rotor rotatably mounted in each cylinder, said rotors being interconnected and arranged out of phase with each other and operating in synchronism with each other, an abutment in each motor cylinder and cooperating with its individual rotor against which the pressure fluid reacts to cause rotation of the rotors, said abutments being connected together to move as one, the structural and operative relationship between the abutments and rotors providing means whereby the abutments are positively oscillated in both directions of their swinging movement, said abutments being oscillated about a given center, an arm connecting the abutments to said center, said pump comprising a pump chamber, said arm passing through said pump chamber and cooperating therewith to act as a pumping element whereby pumping takes place as said abutments oscillate.

11. The combination of a pressure fluid expansible chamber rotary motor and a pump driven thereby, a plurality of chambers forming cylinders for the motors arranged in side by side relation, a rotor rotatably mounted in each cylinder, said rotors being interconnected and arranged out of phase with each other and operating in synchronism with each other, an abutment in each motor cylinder and cooperating with its individual rotor against which the pressure fluid reacts to cause rotation of the rotors, said abutments being connected together to move as one, the structural and operative relationship between the abutments and rotors providing means whereby the abutments are positively oscillated in both directions of their swinging movement, said abutments being constructed on a circular arc and being oscillatable about the center of the circle of said arc, a radial arm connecting said abutments to oscillate them about said center, said pump comprising a pump chamber, said radial arm passing through the pump chamber and cooperating therewith to act as a pumping element whereby pumping takes place as said abutments oscillate.

12. The combination of a pressure fluid expansible chamber rotary motor and a pump driven thereby, a plurality of chambers forming cylinders for the motor arranged in side by side relation, a rotor rotatably mounted in each cylinder, said rotors being interconnected and arranged out of phase with each other and operating in synchronism with each other, an abutment in each motor cylinder and cooperating with its individual rotor against which the pressure fluid reacts to cause rotation of the rotors, said abutments being connected together to move as one, the structural and operative relationship between the abutments and rotors providing means whereby the abutments are positively oscillated in both directions of their swinging movement, said pump comprising a plurality of pump chambers, a pumping element rigidly connected to each abutment to be operated thereby, each pumping element operating in a corresponding pump chamber to produce pumping.

13. The combination of a pressure fluid expansible chamber rotary motor and a pump driven thereby, a plurality of chambers forming cylinders for the motor arranged in side by side relation, a rotor rotatably mounted in each cylinder, said rotors being interconnected and arranged out of phase with each other and operating in synchronism with each other, an abutment in each motor cylinder and cooperating with its individual rotor against which the pressure fluid reacts to cause rotation of the rotors, said abutments being connected together to move as one, the structural and operative relationship between the abutments and rotors providing means whereby the abutments are positively oscillated in both directions of their swinging movement, said pump comprising a plurality of adjoining pump chambers, a pumping element connected to each abutment to be operated thereby, each pumping element operable in its pump chamber to produce pumping.

14. The combination of a pressure fluid expansible chamber rotary motor and a pump driven thereby, a plurality of chambers forming cylinders for the motor arranged in side by side relation, a rotor rotatably mounted in each cylinder, said rotors being interconnected and arranged out of phase with each other and operating in synchronism with each other, an abutment in each motor cylinder and cooperating with its individual rotor against which the pressure fluid reacts to cause rotation of the rotors, said abutments being connected together to move as one, the structural and operative relationship between the abutments and rotors providing means whereby the abutments are positively oscillated in both directions of their swinging movement, said pump comprising a plurality of adjoining pump chambers, a pumping element operating in each pumping chamber, each pumping element being connected to an abutment to be operated thereby to produce pumping and a reservoir for the pump arranged between the motor chambers.

15. The combination of a pressure fluid expansible chamber rotory motor and a pump driven thereby, a plurality of chambers forming cylinders for the motor arranged in side by side relation, a rotor rotatably mounted in each cylinder, said rotors being interconnected and arranged out of phase with each other and operating in synchronism with each other, an abutment cooperating with each rotor against which the pressure fluid reacts to cause rotation of the rotors, said abutments being connected together to move as one, the structural and operative relationship between the abutments and rotors providing means whereby the abutments are positively oscillated in both directions of their swinging movement, the abutments being constructed on a circular arc and being oscillatable about the center of the circle of said arc, said pump comprising an arcuate pumping chamber arranged in the path of movement of the abutments, a pumping element connected to an abutment to move therewith arranged to operate in the pumping chamber to produce pumping.

16. The combination of a pressure fluid expansible chamber rotary motor and a pump driven thereby, a plurality of chambers forming cylinders for the motor arranged in side by side relation, a rotor rotatably mounted in each cylinder, said rotors being interconnected and arranged out of phase with each other and operating in synchronism with each other, an abutment cooperating with each rotor against which the pressure fluid reacts to cause rotation of the rotors, said abutments being connected together to move as one, the structural and operative relationship between the abutments and rotors providing means whereby the abutments are positively oscillated in both directions of their swinging movement, the abutments being constructed on a circular arc and being oscillatable about the center of the circle of said arc, said pump comprising a plurality of arcuate pump chambers arranged in the path of movement of the abutments, a pumping element connected to each abutment to move therewith, each pumping element operable within its pump chamber to produce pumping.

17. The combination of a pressure fluid expansible chamber rotary motor and a pump driven thereby, a plurality of chambers forming cylinders for the motor arranged in side by side relation, a rotor rotatably mounted in each cylinder, said rotors being interconnected and arranged out of phase with each other and operating in synchronism with each other, an abutment cooperating with each rotor against which the pressure fluid reacts to cause rotation of the rotors, said abutments being connected together to move as one, the structural and operative relationship between the abutments and rotors providing means whereby the abutments are positively oscillated in both directions of their swinging movement, the abutments being constructed on a circular arc and being oscillatable about the center of the circle of said arc, said pump comprising a plurality of adjoining arcuate pump chambers separated by a wall arranged in the path of movement of the abutments, a pumping element connected to each abutment to move therewith, each pumping element operable within its pump chamber to produce pumping.

SAMUEL BERNARD GAHM.